(12) United States Patent
Xia et al.

(10) Patent No.: US 9,762,332 B1
(45) Date of Patent: Sep. 12, 2017

(54) HIGH CAPACITY TRANSMISSION SYSTEM WITH FULL NONLINEAR PENALTY CANCELLATION

(71) Applicant: Verizon Patent and Licensing Inc., Arlington, VA (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 25 days.

(21) Appl. No.: 15/062,310

(22) Filed: Mar. 7, 2016

(51) Int. Cl.
*H04B 10/61* (2013.01)
*H04J 14/02* (2006.01)

(52) U.S. Cl.
CPC ......... *H04B 10/6163* (2013.01); *H04J 14/02* (2013.01)

(58) Field of Classification Search
CPC .... H04J 14/02; H04J 14/0227; H04J 14/0221; H04J 14/0212; H04J 14/0283; H04B 10/6163
See application file for complete search history.

(56) References Cited

U.S. PATENT DOCUMENTS

| 2004/0151510 A1* | 8/2004 | Tanaka | H04B 10/2918 398/147 |
| 2005/0069330 A1* | 3/2005 | Kao | H04B 10/505 398/188 |
| 2009/0052905 A1* | 2/2009 | Tomaru | H04B 10/505 398/163 |

* cited by examiner

*Primary Examiner* — Ted Wang (57) ABSTRACT

An optical device includes a light source and diffuser, such as non-linear material, to form a supercontinuum of light energy of different wavelengths. An optical channel generator forms channels from the supercontinuum and forwards a multiplexed signal carrying the channels. The signal travels to an optical receiver through an optical fiber. The optical receiver identifies a non-linear penalty associated with forwarding the multiplexed signal on the optical fiber. The optical receiver modifies attributes of the received channels, such as increasing the magnitude of one of the channels, to cancel out the non-linear penalty.

20 Claims, 8 Drawing Sheets

HIGH CAPACITY TRANSMISSION SYSTEM WITH FULL NONLINEAR PENALTY CANCELLATION

BACKGROUND

In an optical network, dense wavelength division multiplexing (DWDM) permits the multiplexing of multiple optical carriers onto a single optical fiber by using different wavelengths of laser light. In DWDM, each transport channel has only one optical carrier that occupies a fixed optical bandwidth. Since the total usable optical bandwidth of an optical fiber is fixed, a DWDM system may have a fixed number of total optical channels. For example, a typical total usable bandwidth of an optical fiber may be in the range of 5-10 THz, and an associated DWDM system may have a fixed number of optical channels, such as 76 or 128 channels, that share the total usable bandwidth.

In DWDM systems, a nonlinear transmission penalty may arise due to optical nonlinear effects, such as self-phase modulation (SPM) and/or crosstalk between different channels, such as cross phase modulation (XPM). The nonlinear transmission penalty may impact the signal integrity of phase modulated optical signals and contribute to phase noise. Various techniques have been developed to reduce the nonlinear transmission penalty and/or its negative effects. For example, SPM effects may be canceled using nonlinear Schrodinger equation back propagation techniques in calculations after a signal is received coherently so that frequency components within a channel may be corrected for certain frequency and phase changes. However, XPM effects cannot be minimized through back propagation techniques without knowing frequency and phase relationships between the channels. Using a combed light source (i.e., a source that locks together channel frequencies) may reduce frequency uncertainty, but a nonlinear transmission penalty may remain due to phase uncertainty in the channels.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In certain implementations, to eliminate a nonlinear transmission penalty in transmitting optical signals, an optical system described herein may use an optical transmitter system that includes a light source, an amplifier, and a diffuser to generate a supercontinuum that represents a wide optical spectrum. Signals are extracted from the supercontinuum and modulated and multiplexed for transmission across the optical system. For example, the optical system may be a Dense Wavelength Division Multiplexing (DWDM) system. The multiplexed signal is received by an optical transmitter, and the optical transmitter may perform back propagation to cancel any non-linear effects in the received signals to recover the originally transmitted signals due to known characteristics (e.g., known phase differences) in the wavelengths of the supercontinuum. The optical receiver may then process the signals to extract any transmitted data.

Figure 1:
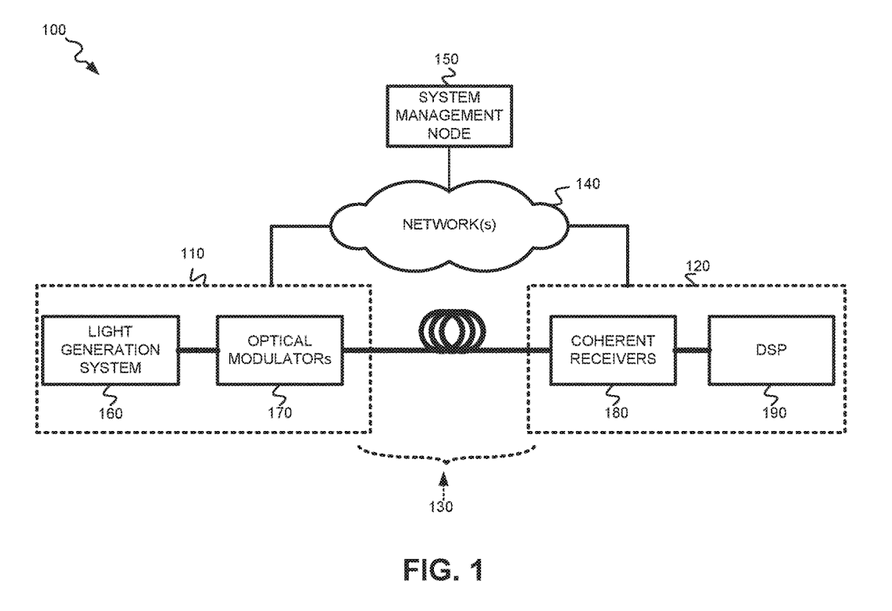
FIG. 1 is a diagram that depicts an exemplary optical network in which data is transmitted across the optical network using light extracted from a supercontinuum.

FIG. 1 is a diagram that depicts an optical network 100 in which data is transmitted across optical network 100 using light energy generated by a seed light source. As shown in FIG. 1, optical network 100 may include an optical transmitter 110, an optical receiver 120, optical fiber 130, a network(s) 140, and a system management node 150.

Optical transmitter 110 may include light system 160 and optical channel generator 170. In one implementation, described below with respect to FIG. 2, light system 160 may include a seed light source that generates a pulsed (e.g., having a short duration) optical output having a narrow spectrum) and optical elements that convert the pulsed optical output into a wide spectrum light, referred to as a "supercontinuum." Optical channel generator 170 may include, among other components described below with respect to FIG. 2, multiple modulators (shown in FIG. 2 as modulators 230) for modulating light of multiple optical channels 1 through n, with each channel 1 through n of optical network 100 having a corresponding optical wavelength $\lambda_1$ through $\lambda_n$. Each of the multiple modulators changes (i.e., modulates) input light of a certain wavelength $\lambda$ based on received data to be transmitted. In one implementation, each of the multiple modulators includes components for applying differential phase modulation to the input light of wavelength $\lambda$ based on the received data to be transmitted.

Optical receiver 120 may include coherent receivers 180 and a Digital Signal Processing (DSP) unit 190 (referred to herein as "DSP 190"). Coherent receivers 180 may include multiple coherent receivers, with each of the multiple coherent receives receiving, coherently detecting, and analog-to-digital converting modulated light signals of a particular wavelength $\lambda$. Coherent receivers 180 may pass the resulting digital signals to DSP 190 for digital signal processing. DSP 190 performs, for example, forward error correction (FEC) upon the digital signals for each channel having one of the wavelengths $\lambda_1$-$\lambda_n$.

Network(s) 140 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN, and/or other types of PLMNs), a satellite network, a telecommunications network (e.g., Public Switched Telephone Networks (PSTNs)), a local area network (LAN), a wide area network (WAN), a metropolitan area network (MAN), an intranet, the Internet, and/or a cable network (e.g., an optical cable network).

System management node 150 may include one or more network devices that connect to network(s) 140 and which receives notifications of conditions associated with optical transmitter 110, optical receiver 120 and/or other components of network(s) 140. In one implementation, for example, the notifications may identify, to system management node 150, a nonlinear transmission penalty associated with the channels carried within optical network 100 due to optical nonlinear effects within each channel, such as self-phase modulation (SPM) and/or crosstalk between different channels, such as cross phase modulation (XPM). System management node 150 may forward instructions to optical receiver 120 to cancel out any detected nonlinear effects. Because the transmitted signals are generated from a supercontinuum and, therefore, share common attributes (e.g., a common phase or common phase differences), a nonlinear penalty in the received signals can be virtually eliminated. For example, if nonlinear effects cause a given signal at a given wavelength to be received at a lower magnitude relative to other signals at other wavelengths, system management node 150 may direct optical receiver 120 to boost the magnitude of the given signal to cancel the nonlinear effects. Similarly, if the nonlinear effects cause a given signal at a wavelength to be received at a different phase relative to other signals at other wavelengths, system management node 150 may direct optical receiver 120 to modify the phase of the given signal to counter the nonlinear effects.

The configuration of the components of optical network 100 depicted in FIG. 1 is for illustrative purposes only, and other configurations may be implemented. Therefore, optical network 100 may include additional, fewer and/or different components, that may be configured differently, than depicted in FIG. 1. For example, though only a single optical transmitter 110, a single optical fiber 130, and a single optical receiver 120 are depicted in FIG. 1, optical network 100 may include multiple different optical transmitters 110 interconnected with multiple different optical receivers 120 via multiple optical fibers 130

Figure 2:
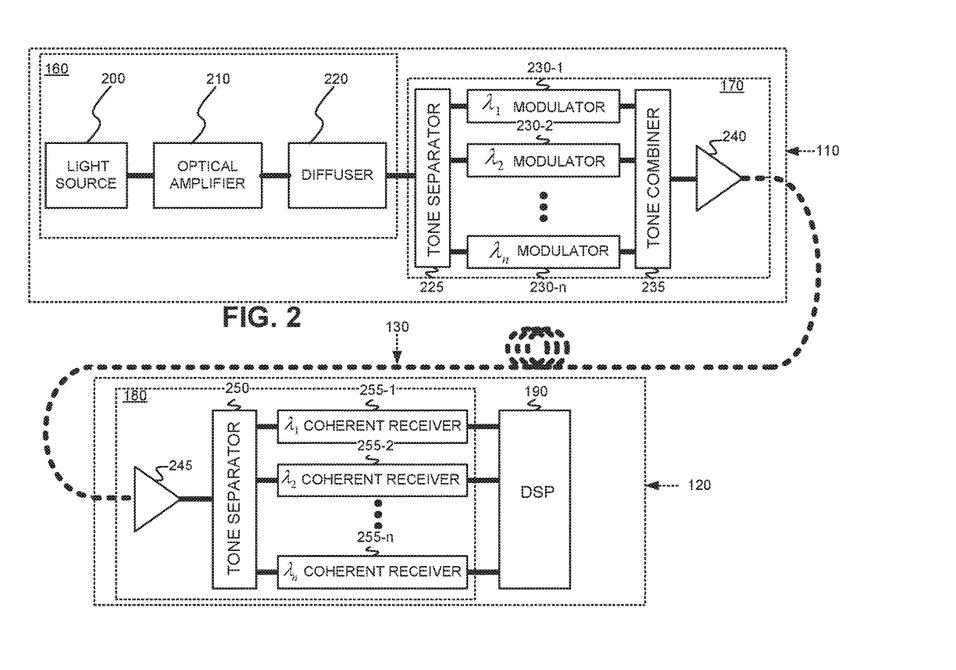
FIG. 2 depicts further details of components of an optical transmitter and an optical receiver included in the optical network of FIG. 1.

FIG. 2 depicts further details of exemplary components of optical transmitter 110 and optical receiver 120. As shown in FIG. 2, light system 160 of optical transmitter 110 may include a light source 200, an optical amplifier 210, and a diffuser 220.

Light source 200 may generate an optical output that is used to form channels in optical network 100. Light source 200 may correspond to a seed source, such as a laser that transmits ultrashort (e.g., of picosecond duration) light pulses. For example, light source 200 may be a 28 Gbaud (gigabaud) soliton laser. A soliton laser may send light pulses that will not change their shape because nonlinear effects in the light pulses balance a dispersion of the light pulses. For example, the soliton laser may include a mode-locked color center laser coupled to a second cavity that contains a fiber. The soliton laser may form short pulses through the interaction of the laser (or main) cavity with the fiber (or control) cavity, and an output intensity may be stabilized by controlling the control cavity. Because the soliton laser uses of the nonlinear (i.e. intensity-dependent) refractive index of the fiber, pulse shape and width may also be stabilized.

Optical amplifier 210 may receive and amplify light energy generated by light source 200. For example, optical amplifier 210 may include, for example, to: (1) a doped fiber amplifier (e.g., an Erbium doped fiber amplifier (EDFA)) that uses stimulated emission in the amplifier's gain medium to amplify received light energy; (2) a semiconductor optical amplifier (SOAs) that uses electron-hole recombination to amplify received light energy; (3) a Raman amplifier that uses Raman scattering of incoming light with phonons in the lattice of the gain medium to produce addition (e.g., amplifying) photons coherent with the incoming photons from light source 200; or (4) a parametric amplifier that uses parametric amplification to amplify received light energy. Optical amplifier 210 may output light pulses that have similar wavelengths bands of higher intensity than the light pulses generated by light source 200. For example, optical amplifier 210 may be a high-power optical amplifier, such as an amplifier that has more than a 30 dBm (decibel-milliwatts) of output power.

Diffuser 220 may receive and diffuse (e.g., spread out the wavelengths of) the amplified light pulses outputted by optical amplifier 210. For example, diffuser 220 may be a nonlinear medium, such as highly nonlinear fibers (HNLFs). Types of HNLFs include, for example, (1) narrow-core fibers with silica cladding; (2) tapered fibers with air cladding in which fibers are stretched to produce thin cladding diameters (approximately 2 μm) and the surrounding air acts as the cladding; (3) microstructured fibers (also referred to as "holey" fibers or photonic crystal fibers (PCFs)) that include air holes introduced within cladding of the fibers; and (4) non-silica fibers, such as fibers produced from lead silicates, chalcogenides, tellurite oxide, bismuth oxide, etc.

The ultrashort pulses from amplifier 210 may be affected by dispersion and a multitude of nonlinear effects when passed through diffuser 220, and these nonlinear effects may include, for example, SPM, XPM, four-wave mixing (FWM) whereby interactions between two or three wavelengths produce two or one new wavelengths, stimulated Raman scattering (SRS) whereby photons of the pulse interact with optical phonons, etc., together with dispersion. The dispersion and the nonlinear effects may generate frequencies outside the input pulse spectrum, and for sufficiently intense pulses, the HNLFs can extend the pulse spectrum over a wide frequency range referred to as a supercontinuum.

The resulting supercontinuum, generated by diffuser 220 from the received amplified light pulses, may have a sufficiently large bandwidth to cover the desired optical bands for the channels in optical network 100. As used herein, the term "supercontinuum" is intended to include a broadening of spectral input (e.g., from light source 200) around a peak wavelength generated by light source 200. Furthermore, the power (or brightness) of the wavelengths included in a supercontinuum may have a spectral flatness such that the magnitudes of the respective wavelengths differ by less than a desired amount (e.g., between 5 dB to 40 dB).

As described in greater detail below, bands of wavelengths included in the supercontinuum may share certain optical characteristics, such as a common phase and/or known phase differences. Thus, even if phase changes occur in the light output of light source 200 (or is introduced by amplifier 210), this phase change may occur consistently throughout the wavelengths in the supercontinuum. In this way, fixed phase coupling relationships exist in the different wavelengths included in the supercontinuum. Similarly, if a peak wavelength (or frequency) generated by light source 200 changes and/or a wavelength shift is introduced by amplifier 210, the supercontinuum continues to provide a full spectrum for channels to be transmitted through optical system 100. Consequently, even if phase and/or frequency changes occur in light source 200, optical transmitter 110 may continue to output channels having known frequencies and known phase relationships. As described below, this type of channel relationship enables full non-linear penalty cancellation by optical receiver 120 that cannot be achieved if different channels are generated using respective lasers since the exact frequency and phase relationships of the respective lasers cannot be reliably determined.

Furthermore, HNLFs may enable large Raman-induced frequency shifts (RIFS) that enable tuning of the peak wavelength generated by light source 200. For example, if diffuser 220 include an HNLF, diffuser 220 may be used to adjust a peak (or center) wavelength so that the supercontinuum includes a desired wavelength or range of wavelengths.

If the input pulses generated by light source 200 are of sufficiently short duration (e.g., about a picosecond), then self-phase modulation in diffuser 220 may lead to significant spectral broadening that is also temporally coherent. However, if the pulses from light source 200 have too long of a duration (e.g., longer than a picosecond), then stimulated-Raman scattering tends to dominate, causing a series of cascaded discrete Stokes lines to appear until a zero dispersion wavelength is reached. When the zero dispersion wavelength is reached, a soliton Raman continuum may form, causing the generation of the supercontinuum to be more inefficient.

As further shown in FIG. 2, optical channel generator 170 of optical transmitter 110 may include a tone separator 225, multiple modulators 230-1 through 230-n, a tone combiner 235, and an output optical amplifier 240.

Tone separator 225 may couple to diffuser 220 to receive the generated supercontinuum. The received supercontinuum may include multiple wavelengths $\lambda_1$ through $\lambda_n$, corresponding to channels 1 through n. Tone separator 225 wavelength division directs light of the multiple wavelengths $\lambda_1$ through $\lambda_n$, included in the supercontinuum, into multiple outputs, with each output of tone separator 225 being associated with a different one of wavelengths $\lambda_1$ through $\lambda_n$. The multiple outputs of tone separator 225 connect to modulators 230-1 through 230-n, with each of modulators 230-1 through 230-n receiving a respective wavelength of wavelengths $\lambda_1$ through $\lambda_n$. For example, the first output of tone separator 225 may include demultiplexed light having a wavelength of $\lambda_1$ and that may be inputted to modulator 230-1. As a further example, the second output of tone separator 225 may include a demultiplexed light having a wavelength of $\lambda_2$ and that may be inputted to modulator 230-2. As yet another example, the nth output of tone separator 225 may include demultiplexed light having a wavelength of $\lambda_n$ and that may be inputted to modulator 230-n. Even if a wavelength of the output generated by light source 200 changes and the resulting supercontinuum shifts (e.g., includes a different range of frequencies), the supercontinuum may still include wavelengths $\lambda_1$ through $\lambda_n$. Thus, tone separator 225 may continue to extract wavelengths $\lambda_1$ through $\lambda_n$ for use in generating output channels despite frequency shifts in the output of light source 200.

Modulators 230-1 through 230-n (generically referred to herein as "modulator 230" or "modulators 230") may each receive demultiplexed light of a respective wavelength from tone separator 225. For example, modulator 230-1 may receive demultiplexed light of wavelength $\lambda_1$ from tone separator 225, modulator 230-2 may receive demultiplexed light of wavelength $\lambda_2$ from tone separator 225, and modulator 230-n may receive demultiplexed light of wavelength $\lambda_n$. Each modulator 230 may apply a differential phase modulation to the received light from tone separator 225 in accordance with data to be transmitted on the particular channel corresponding to the wavelength $\lambda$ handled by the modulator 230. For example, modulator 230-1 may receive demultiplexed light of wavelength $\lambda_1$ from tone separator 225 and may apply a differential phase modulation to the light based on a first stream of data (not shown in FIG. 2) received at modulator 230-1. As another example, modulator 230-n may receive a demultiplexed light of wavelength $\lambda_n$ from tone separator 225 and may apply a differential phase modulation to the light based on an $n^{th}$ stream of data (not shown in FIG. 2) received at modulator 230-n.

Tone combiner 235 may receive the modulated light of wavelengths $\lambda_1$ through $\lambda_n$ from modulators 230-1 through 230-n and may multiplex the light into a single multi-wavelength optical output comprising modulated optical signals of the multiple wavelengths $\lambda_1$ through $\lambda_n$. Tone combiner 235 may supply the multi-wavelength output to optical amplifier 240. Optical amplifier 240 may amplify the signal amplitudes of the various wavelengths $\lambda_1$ through $\lambda_n$ for transmission over optical fiber 130. Optical amplifier 240 may include, for example, one or more erbium doped fiber amplifiers. Optical fiber 130 is depicted as a single optical fiber span connecting optical transmitter 110 and optical receiver 120. In other implementations, however, optical fiber 130 may include multiple interconnecting fibers, possibly including optical switches or routers, for switching/routing optical signals from optical transmitter 110 to optical receiver 120. In one implementation, optical fiber 130 is a low polarization mode dispersion (PMD) fiber. PMD is a form of modal dispersion in which optical signals of different polarizations spread while travelling through a waveguide because random imperfections and asymmetries within the waveguide cause the optical signals to travel at different speeds through the waveguide.

FIG. 2 additionally depicts coherent receivers 180 of optical receiver 120 as including an input optical amplifier 245, a tone separator 250, multiple coherent receivers 255-1 through 255-n, and DSP 190.

Input optical amplifier 245 may amplify the signal amplitudes of the various wavelengths $\lambda_1$ through $\lambda_n$ of optical signals transmitted over optical fiber 130 and received at optical receiver 120. Optical amplifier 245 may include, for example, one or more erbium doped fiber amplifiers. Tone separator 250 may perform wavelength division demultiplexing of the single multi-wavelength optical output of optical transmitter 110. As previously described, the optical output of optical transmitter 110 may include modulated optical signals of the multiple wavelengths $\lambda_1$ through $\lambda_n$, and tone separator 250 may extract the multiple signals into multiple outputs, with each output of tone separator 250 being associated with a different wavelength of wavelengths $\lambda_1$ through $\lambda_n$. The multiple outputs of tone separator 250 may be connected to coherent receivers 255-1 through 255-n.

Each of the coherent receivers 255-1 through 255-n may receive the demultiplexed optical signals of a respective one of wavelengths $\lambda_1$ through $\lambda_n$, and may coherently detect and perform analog-to-digital conversions of the optical signals of the respective wavelength $\lambda$. Coherent receivers 255-1 through 255-*n* each pass the resulting digital signals to DSP 190 for digital signal processing.

DSP 190 performs, for example, forward error correction (FEC) upon the digital signals for each channel having one of the wavelengths $\lambda_1$-$\lambda_n$. In one exemplary implementation, the FEC algorithm performed by DSP 190 includes Reed-Solomon forward error correction. Other types of FEC, however, may alternatively be used. In addition, DSP 190 may apply a nonlinear compensation algorithm, described further below, to compensate for propagation nonlinearities induced during traversal of optical fiber 130 in order to achieve full nonlinear penalty cancellation. For example, DSP 190 may leverage The configuration of the components of the optical network depicted in FIG. 2 is for illustrative purposes only, and other configurations may be implemented. Therefore, the optical network may include additional, fewer and/or different components, that may be configured differently, than depicted in FIG. 2.

Figure 3:
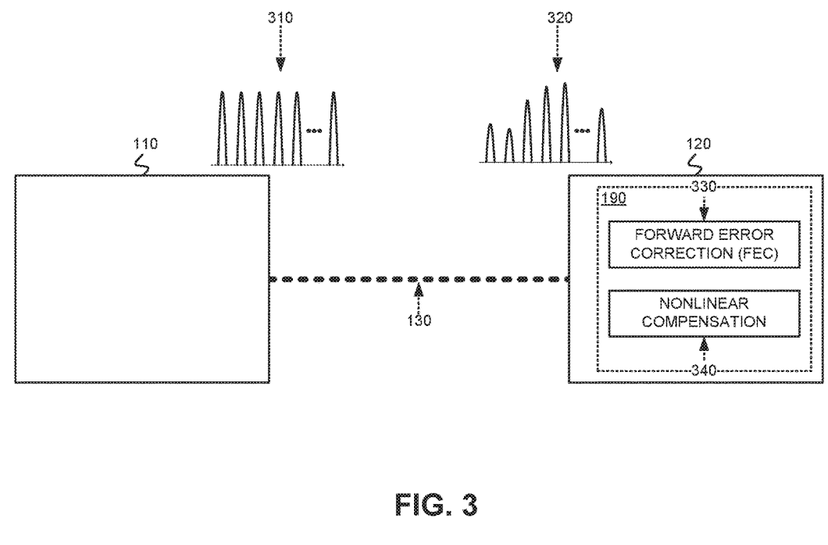
FIG. 3 is a diagram that depicts functions performed at the optical transmitter of FIG. 1 when transmitting optical signals extracted from a supercontinuum, and functions performed at the optical receiver of FIG. 1 when receiving and processing the transmitted optical signals after traversal of the optical fiber.
Figure 4:
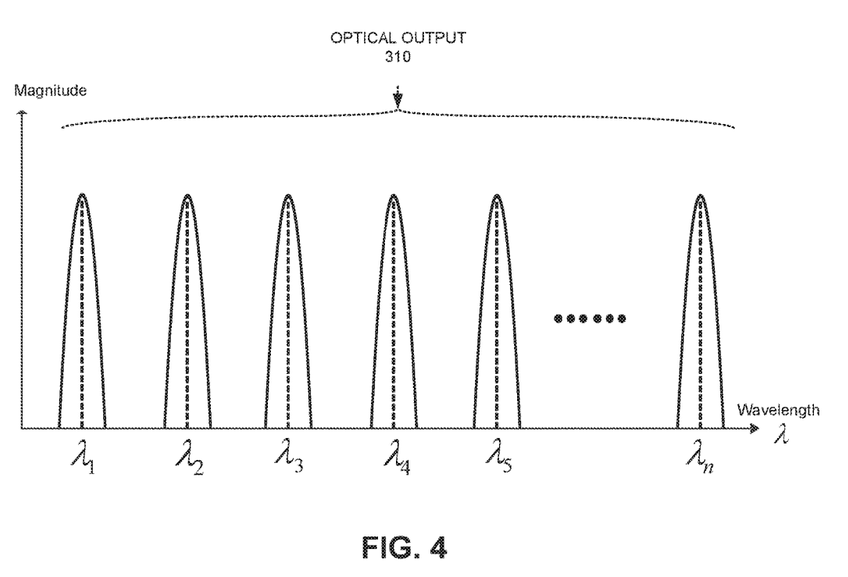
FIG. 4 is a diagram that depicts attributes of an optical output generated by the optical transmitter in the optical network of FIG. 1.

FIG. 3 is a diagram that depicts functions performed at optical transmitter 110 when transmitting optical signals generated using a generated supercontinuum, and functions performed at optical receiver 120 when receiving and processing the transmitted optical signals after traversal of optical fiber 130. As shown in FIG. 3, optical transmitter 110 (e.g., tone separator 225) may generate an optical output 310 that includes multiple channels of light. FIG. 4 depicts further details of the multiple wavelengths of optical output 310 generated by tone separator 225. As shown in FIG. 4, optical output 310 may include multiple different wavelengths $\lambda_1$ through $\lambda_n$, each wavelength $\lambda$ being associated with a respective one of channels 1 through n, with the frequency/wavelength of each of the channels 1 through n of optical output 310 being locked to each other. For example, the frequency difference between the channels may be constant across all the multiple channels of optical output 310. Light of each of the multiple channels of optical output 310 may be modulated by modulators 230 based on received input data that is to be transmitted, and the modulated optical output 310 may then be combined, or multiplexed, by tone combiner 235 for transmission through optical fiber 130. For example, modulators 230 may perform a differential phase modulation in which each optical signal extracted by tone separator is represented by a phase difference between two adjacent bits of data within the stream of the input data. In the example shown in FIG. 4, each of the channels included in modulated optical output 310 may be transmitted at a substantially equal magnitude (or power) level within optical fiber 130.

Figure 5:
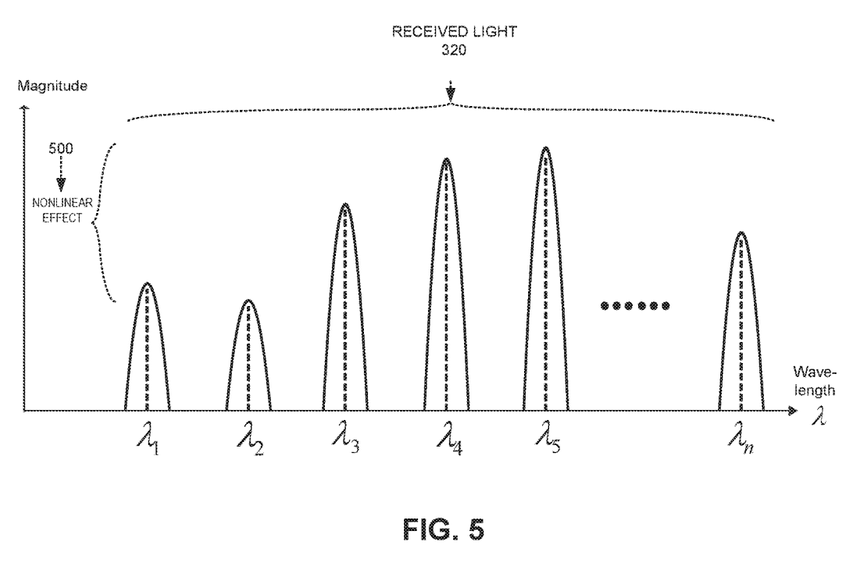
FIG. 5 depicts attributes of received light, received at the optical receiver of FIG. 1, corresponding to the optical output shown in FIG. 4 after traversing an optical fiber in the optical network of FIG. 1.

Referring again to FIG. 3, as the modulated, multiplexed optical output 310 traverses optical fiber 130, nonlinearities may be introduced in optical output 310 due to the fiber medium, environmental factors, and the effect of neighboring channels in optical output 310. Optical receiver 120 (e.g., tone separator 250) may receive and demultiplex a distorted version 320 that reflects changes in optical output 310 caused by transmission through optical fiber 130. FIG. 5 depicts further details of the nonlinear distorted version 320 as received at optical receiver 120 after traversing optical fiber 130.

As seen in FIG. 5, a nonlinear effect 500 is evidenced in the multiple channels of nonlinear distorted version 320, with the various wavelengths including a magnitude distortion relative to one another, and relative to optical output 310. Although nonlinear effect 500 is presented in the context of magnitude differences, it should be appreciated that nonlinear effect 500 may also include other factors, such as changes in frequency, phase, etc. Furthermore, although nonlinear effects 500 are presented in the context of constant magnitude differences, nonlinear effect 500 may include periodic and/or varying magnitude levels in the different wavelengths (e.g., a magnitude for signals at a given wavelength may vary during different time periods). Nonlinear effects 500 may be measured at optical receiver 120 by comparing attributes of nonlinear distorted version 320 to known attributes of optical output 310 (e.g., attributes associated with the supercontinuum such as magnitude, phase, etc.).

Referring again to FIG. 3, DSP 190 at optical receiver 120 performs forward error correction (FEC) 330 upon the received, differentially modulated signals. In one implementation, FEC 330 may include using a FEC algorithm such as the Reed-Solomon error correction algorithm. FEC 330 corrects any isolated phase errors introduced in the transmitted optical signals.

In addition, DSP 190 may apply non-linear compensation 340 to the forward error corrected digital signals to compensate for propagation nonlinearities induced during traversal of optical fiber 130. Field propagation in optical fiber 130 may be governed by the nonlinear Schrodinger equation, and the optical signals received at optical receiver 120 can be used as an initial condition. Using the nonlinear Schrodinger equation and nonlinear distorted version 320 received at optical receiver 120 as the initial condition, the nonlinear Schrodinger equation may be used to computer model the signal transmitted at optical transmitter 110 prior to propagation across optical fiber 130. The result of the computer modeling, using the Schrodinger equation and the known initial condition of the optical channels, is the original transmitted optical signals, from modulators 230-1 through 230-*n*, transmitted from optical transmitter 110. The computer modeling, using the nonlinear Schrodinger equation, thus, cancels nonlinearities induced in the optical signals 310 during its traversal of optical fiber 130.

For example, as previously described, the different wavelengths included in the supercontinuum may have known phase and frequency relationships. Consequently, even if phase and/or frequency changes occur in light source 200, optical transmitter 110 may continue to output channels at known frequencies and known phase relationships. This characteristic enables full non-linear penalty cancellation that cannot be achieved if different channels are generated using respective lasers since the exact frequency and phase relationships of the respective lasers cannot be reliable determined. For example, the nonlinear Schrodinger equation includes phase coupling relationship terms that can be canceled in channels generated from the supercontinuum due to the fixed phase relationship in the supercontinuum. Thus, DSP 190 may determine that any detected phase or other differences in received light 130 are introduced through non-linear effects within optical fiber 130 and should be cancelled since these differences are not present in optical output 310 (due to the supercontinuum). In contrast, the nonlinear Schrodinger equation cannot be used to fully correct for phase and/or frequency separation differences in received signals generated by multiple lasers since the phase and/or frequency separation differences may be characteristics of the originally transmitted signals (e.g., due to differences in the multiple lasers) and not introduced by an optical fiber carrying the signals. Because the receiver cannot differentiate between transmitter-induced signal anomalies and signal anomalies caused by non-linear effects, cancelling the signal anomalies in received signals generated by multiple lasers may lead to inaccurate data transmission.

In this way, complete nonlinear penalty cancellation may be achieved by optical receiver 120, allowing fiber capacity to be significantly improved. For example, total cancelling of nonlinear effects allows that more channels of closer spaced wavelengths λ to be carried on optical fiber 130 because wavelength spacing is no longer needed to manage nonlinear effects.

Figure 6:
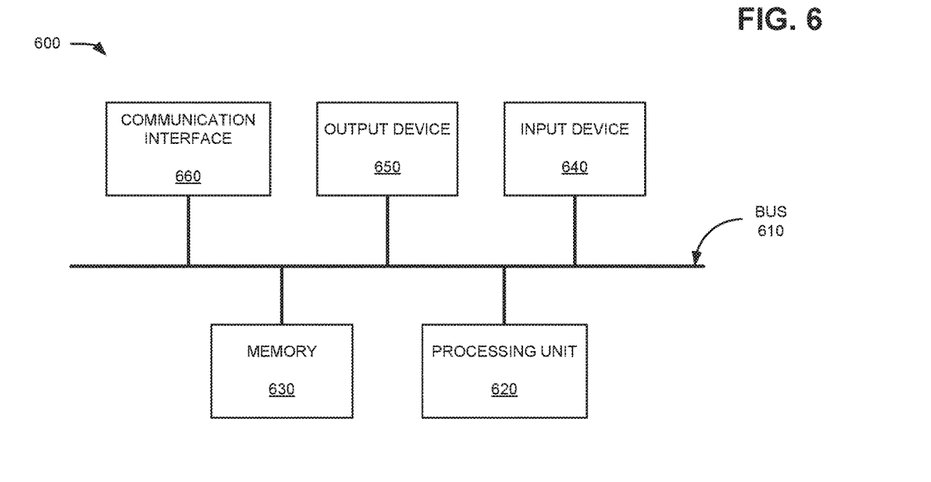
FIG. 6 is a diagram illustrating exemplary components of a computing device that may be included in the optical network of FIG. 1.

FIG. 6 is a diagram illustrating exemplary functional components of a computing device 600 according to an implementation described herein. For example, system management node 150 and/or an element of network 140 (e.g., a hot spot, a node, router, blade, optical transmitter 110, optical receive 120, etc.) may include one or more computing devices 600. As shown in FIG. 6, device 600 may include a bus 610, a processing unit 620, a memory 630, an input device 640, an output device 650, and a communication interface 660.

Bus 610 may include a path that permits communication among the components of device 600. Processing unit 620 may include any type of single-core processor, multi-core processor, microprocessor, latch-based processor, and/or processing logic (or families of processors, microprocessors, and/or processing logics) that interprets and executes instructions. In other embodiments, processing unit 620 may include an application-specific integrated circuit (ASIC), a field-programmable gate array (FPGA), and/or another type of integrated circuit or processing logic.

Memory 630 may include any type of dynamic storage device that may store information and/or instructions, for execution by processing unit 620, and/or any type of non-volatile storage device that may store information for use by processing unit 620. For example, memory 630 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 640 may allow an operator to input information into device 600. Input device 640 may include, for example, a keyboard, a mouse, a pen, a microphone, a remote control, an audio capture device, an image and/or video capture device, a touch-screen display, and/or another type of input device. In some embodiments, device 600 may be managed remotely and may not include input device 640. In other words, device 600 may be "headless" and may not include a keyboard, for example.

Output device 650 may output information to an operator of device 600. Output device 650 may include a display, a printer, a speaker, and/or another type of output device. For example, device 600 may include a display, which may include a liquid-crystal display (LCD) for displaying content to the customer. In some embodiments, device 600 may be managed remotely and may not include output device 650. In other words, device 600 may be "headless" and may not include a display, for example.

Communication interface 660 may include a transceiver that enables device 600 to communicate with other devices and/or systems via network 140 using, for example, wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 660 may include a transmitter that converts baseband signals to radio frequency (RF) signals and/or a receiver that converts RF signals to baseband signals.

Communication interface 660 may include and/or may be coupled to an antenna for transmitting and receiving RF signals. For example, communication interface 660 may be coupled to an antenna assembly that includes one or more antennas to transmit and/or receive RF signals. The antenna assembly may, for example, receive data from communication interface 660 and transmit RF signals associated with the data, or the antenna assembly may receive RF signals and provide them to communication interface 660 to be processed.

Communication interface 660 may include a logical component that includes input and/or output ports, input and/or output systems, and/or other input and output components that facilitate the transmission of data to other devices. For example, communication interface 660 may include a network interface card (e.g., Ethernet card) for wired communications and/or a wireless network interface (e.g., a Wi-Fi) card for wireless communications. Communication interface 660 may also include a universal serial bus (USB) port for communications over a cable, a Bluetooth® wireless interface, a RFID interface, a NFC wireless interface, and/or any other type of interface that converts data from one form to another form.

As will be described in detail below, device 600 may perform certain operations, and device 600 may perform these operations in response to processing unit 620 executing software instructions contained in a computer-readable medium, such as memory 630. A computer-readable medium may be defined as a non-transitory memory device. A memory device may be implemented within a single physical memory device or spread across multiple physical memory devices. The software instructions may be read into memory 630 from another computer-readable medium or from another device. The software instructions contained in memory 630 may cause processing unit 620 to perform processes described herein. Alternatively, hardwired circuitry may be used in place of, or in combination with, software instructions to implement processes described herein. Thus, implementations described herein are not limited to any specific combination of hardware circuitry and software.

Although FIG. 6 shows exemplary components of device 600, in other implementations, device 600 may include fewer components, different components, additional components, or differently arranged components than those depicted in FIG. 6. Additionally, or alternatively, one or more components of device 600 may perform one or more tasks described as being performed by one or more other components of device 600.

Figure 7:
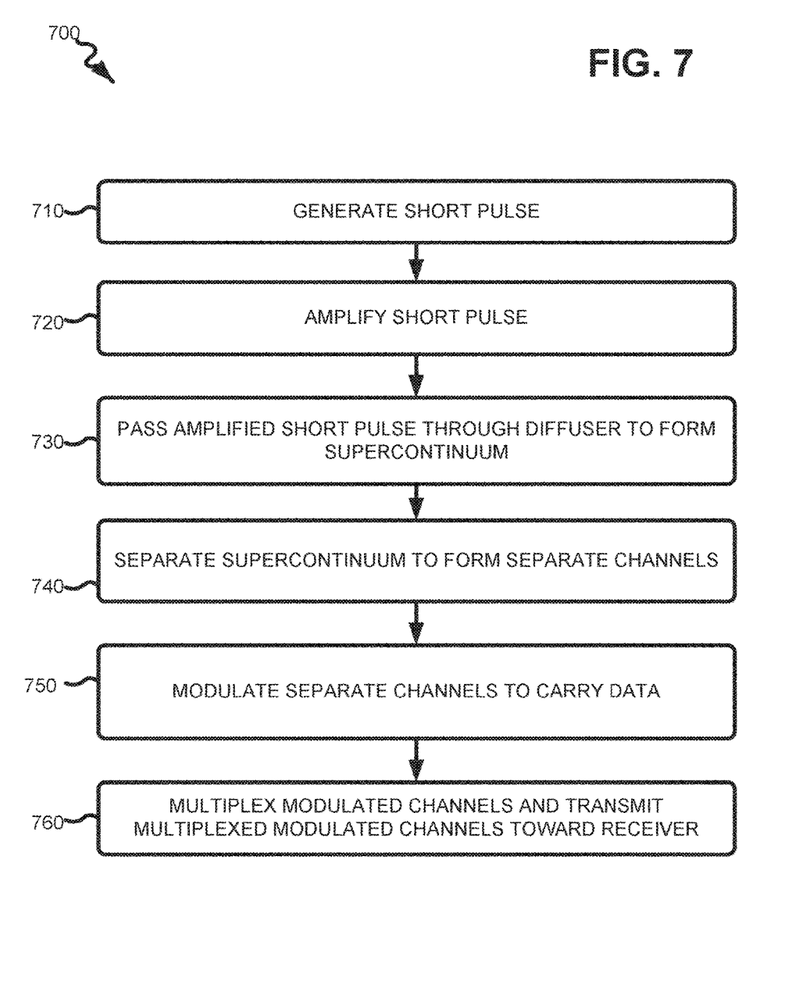
FIG. 7 is a flow diagram that illustrates an exemplary process for transmitting optical signals from a supercontinuum generated from a light source using a nonlinear material.

FIG. 7 is a flow diagram that illustrate an exemplary process 700 for transmitting optical signals using a supercontinuum generated by a nonlinear material. Process 700 is described below with reference to FIGS. 1-6. Furthermore, process 700 may be implemented by optical transmitter 110. In other implementations, one or more steps of process 700 may be performed by another component, such as optical receiver 120 and/or another component that is not shown in FIGS. 1-6.

As shown in FIG. 7, process 700 may include generating a short pulse (block 710) and amplifying the short pulse (block 720). For example, short optical pulses, centered at a wavelength λ, may be generated by light source 200, such as a short-pulse (e.g., picosecond) soliton laser. In block 720, the pulses may be amplified by one or more optical amplifier 210 so that the short pulses have a greater brightness (or magnitude) but are still centered on wavelength λ. For example, the pulses may be passed through a series of optical amplifier 210 until a desired power (or intensity) level is achieved.

The amplified pulses may then be passed through diffuser 220 to generate a supercontinuum (block 730). For example, diffuser 220 may be a nonlinear material that causes light energy of other wavelengths from the amplified pulses due to nonlinear effects. The supercontinuum may be separated into different output channels of individual wavelengths $\lambda_1$, $\lambda_2$, $\lambda_3$, . . . , $\lambda_n$ (block 740). For example, the output (e.g., the supercontinuum) from diffuser 220 may be directed to tone separator 225 of optical channel generator 170, and tone separator 225 may use wavelength division to separate the supercontinuum into different wavelength outputs, with each output corresponding to a single channel (e.g., a single wavelength of light).

Modulators 230 may then modulate the separate channels to carry data (block 750). For example, each modulator 230, associated with a particular wavelength of the outputs, may apply a differential modulation to modulate the outgoing wavelength in accordance with the data to be transmitted. Referring to FIG. 2, modulators 230-1 through 230-n each receive wavelength division demultiplexed light corresponding to a respective wavelength $\lambda_1$ through $\lambda_n$. Each modulator 230 receives an input data stream (not shown in FIG. 2) and performs differential modulation upon the demultiplexed light to generate a modulated optical signal output. In one implementation, the differential modulation may include differential phase modulation applied by each modulator 230 based on a respective stream of data received at that modulator. For example, modulator 230-2 receives demultiplexed light of wavelength $\lambda_2$ from tone separator 225, and sequential bits of a stream of input data, and differentially phase modulates the light of wavelength $\lambda_2$ based on the sequential bit values of the stream of input data.

Tone combiner 235 may multiplex the modulated channels and transmit the multiplexed, modulated channels toward optical receiver 120 (block 760). For example, tone combiner 235 wavelength division multiplexes multiple wavelengths from modulators 230 into a multi-wavelength multiplexed optical output. Tone combiner 235 receives the multiple modulated optical signal outputs from modulators 230-1 through 230-n, including optical signals transmitted via wavelengths $\lambda_1$ through $\lambda_n$, and multiplexes the light of different wavelengths into a single multi-wavelength optical output, which is provided to optical amplifier 240. Optical amplifier 240 amplifies the multi-wavelengths of light to boost the signal power for transmission over optical fiber 130. The amplified multiplexed signal may then be forwarded via optical fiber 130 toward optical receiver 120.

Figure 8:
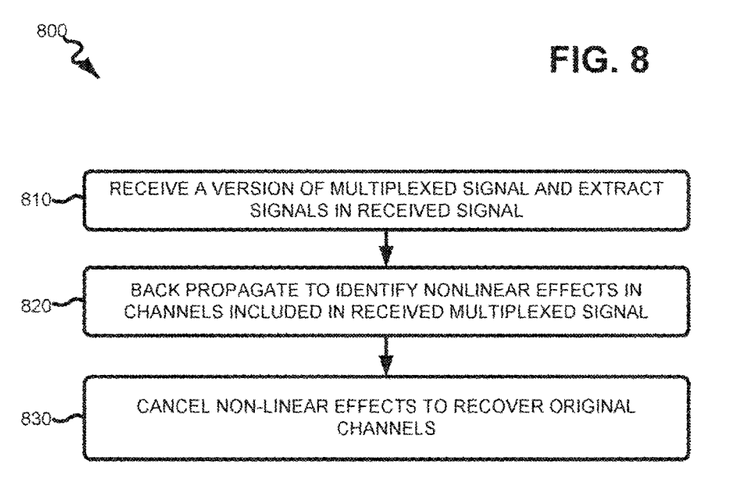
FIG. 8 is a flow diagram that illustrates an exemplary process for cancelling non-linear effects in received optical signals transmitted in the process of FIG. 7.

FIG. 8 is a flow diagram that illustrates an exemplary process 800 for processing optical signals generated from a supercontinuum and received over an optical fiber(s). Process 800 may be implemented by optical receiver 120.

Optical receiver 120 may receive a version of multiplexed signal sent from optical transmitter 110 and may extract signals carried in the received signal (block 810). For example, tone separator 250 of optical receiver 120 may perform wavelength division demultiplexing of the multi-wavelength multiplexed input signals received from optical transmitter 110 over optical fiber 130. Referring to FIG. 2, modulated multi-wavelength light signals received over optical fiber 130 from optical transmitter 110 are amplified by optical amplifier 245 and provided to tone separator 250.

Tone separator 250 wavelength division demultiplexes the single input, comprising the differentially modulated signals from the generated super supercontinuum, into multiple outputs, with each of the outputs corresponding to one of the multiple wavelengths $\lambda_1$ through $\lambda_n$.

In block 810, each of coherent receivers 255-1 through 255-n, associated with a particular wavelength of the signals, converts input optical signals of the particular wavelength into a digital signal output. Each of the coherent receivers 255-1 through 255-n receives demultiplexed optical signals of a respective one of wavelengths $\lambda_1$ through $\lambda_n$ from tone separator 250, and coherently detects and analog-to-digitally converts the optical signals of the respective wavelength λ. Coherent receivers 255-1 through 255-n each pass the resulting digital signals to DSP 190 for digital signal processing. Coherent receivers 255 may use known techniques for coherently detecting and converting modulated light signals of a respective wavelength λ to a digital signal output.

Optical receiver 120 may perform back propagation to identify non-linear effects in the channels included in a received multiplexed signal (block 820). For example, DSP 190 may perform forward error correction (FEC) on the digital signal outputs from coherent receivers 255-1 through 255-n to correct errors. The errors may include, for example, phase error that may occur when the timing of optical transmitter 110 and optical receiver 120 go out of alignment. In one exemplary implementation, DSP 190 employs a FEC algorithm such as, for example, Reed-Solomon error correction. Other types of FEC, however, may alternatively be used. Use of FEC by DSP 190 may include resetting the reference phase to handle any optical interruptions. Optical receiver 120 may then identify differences between the received signals, after FEC.

DSP 190 may cancel the non-linear effects to recover the originally transmitted channels (block 830). The propagation nonlinearities are induced in the multi-wavelength signals during traversal of the optical fiber. As previously described, DSP 190 may apply non-linear compensation 340 to the digital signals, based on the nonlinear Schrodinger equation, to cancel nonlinearities induced in the signals while traversing optical fiber 130. Using the nonlinear Schrodinger equation, and the received optical signals at optical receiver 120 as an initial condition, the Schrodinger equation may be used to computer model the signal transmitted at optical transmitter 110 prior to propagation across optical fiber 130. The result of the computer modeling, using the Schrodinger equation and the initial condition of the received optical signals, should be the original optical signals, reconstructed via the computer modeling, transmitted by optical transmitter 110.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 7 and 8, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   generating, by a light source included in an optical device, a light pulse;
   amplifying, by an amplifier included in the optical device, the light pulse to form an amplified light pulse;
   modifying, by a diffuser included in the optical device, the amplified light pulse to form a supercontinuum;
   forming, by an optical channel generator included in the optical device, channels from the supercontinuum;
   combining, by the optical channel generator, the channels to form a multiplexed optical signal;
   forwarding, by the optical channel generator, the multiplexed optical signal to an optical receiver via an optical fiber,
   determining, by the optical receiver, a nonlinear penalty associated with transmitting the multiplexed optical signal to the optical receiver via the optical fiber; and
   cancelling, by the optical receiver, the nonlinear penalty.

2. The method of claim 1, wherein the optical channel generator includes:
   a tone separator configured to wavelength division demultiplex the supercontinuum to form the channels;
   a plurality of optical modulators configured to modulate the channels based on data to be transmitted; and
   a tone combiner configured to multiplex the modulated channels into the multiplexed optical signal.

3. The method of claim 1, wherein the diffuser includes highly nonlinear fiber (HNLF), and wherein the HNLF includes at least one of:
   a narrow-core fiber with silica cladding;
   a tapered fiber with air cladding;
   a microstructured fiber that includes air holes introduced within a cladding; or
   a non-silica fiber.

4. The method of claim 1, wherein the amplifier includes an erbium doped fiber amplifier.

5. The method of claim 1, wherein the nonlinear penalty attenuates one of the channels relative to other ones of the channels, and wherein canceling the nonlinear penalty includes:
   increasing a magnitude of the attenuated one of the channels relative to the other ones of the channels.

6. The method of claim 1, wherein the nonlinear penalty modifies a phase of one of the channels relative to other ones of the channels, and wherein canceling the nonlinear penalty includes:
   changing the phase of the attenuated one of the channels relative to the other ones of the channels.

7. The method of claim 1, wherein the light source includes a picosecond soliton laser.

8. A device comprising:
   a light source configured to generate a light pulse;
   an amplifier configured to receive and amplify the light pulse to form an amplified light pulse;
   a diffuser configured to receive the amplified light pulse and form a supercontinuum;
   an optical channel generator configured to:
      form channels from the supercontinuum,
      combine the channels to form a multiplexed optical signal, and
      forward the multiplexed optical signal via an optical fiber; and
   an optical receiver configured to:
      receive the multiplexed optical signal through the optical fiber,
      determine a nonlinear penalty associated with transmitting the multiplexed optical signal via the optical fiber, and
      cancel the nonlinear penalty.

9. The device of claim 8, wherein the optical channel generator includes:
   a tone separator configured to wavelength division demultiplex the supercontinuum to form the channels;
   a plurality of optical modulators configured to modulate the channels based on data to be transmitted; and
   a tone combiner configured to multiplex the modulated channels into the multiplexed optical signal.

10. The device of claim 8, wherein the diffuser includes highly nonlinear fiber (HNLF), and wherein the HNLF includes at least one of:
    a narrow-core fiber with silica cladding;
    a tapered fiber with air cladding;
    a microstructured fiber that includes air holes introduced within a cladding; or
    a non-silica fiber.

11. The device of claim 8, wherein the amplifier includes an erbium doped fiber amplifier.

12. The device of claim 8, wherein the nonlinear penalty attenuates one of the channels relative to other ones of the channels, and wherein the optical receiver, when canceling the nonlinear penalty, is further configured to increase a magnitude of the attenuated one of the channels relative to the other ones of the channels.

13. The device of claim 8, wherein the nonlinear penalty modifies a phase of one of the channels relative to other ones of the channels, and wherein the optical receiver, when canceling the nonlinear penalty, is further configured to change the phase of the attenuated one of the channels relative to the other ones of the channels.

14. The device of claim 8, wherein the light source includes a picosecond soliton laser.

15. A non-transitory computer readable medium configured to store instructions executed by an optical device, wherein the optical device includes:
   a light source configured to generate a light pulse;
   an amplifier configured to receive and amplify the light pulse to form an amplified light pulse;
   a diffuser configured to receive the amplified light pulse and form a supercontinuum; and
   an optical channel generator configured to:
      form channels from the supercontinuum,
      combine the channels to form a multiplexed optical signal, and
      forward the multiplexed optical signal to an optical receiver via an optical fiber, and
   wherein the instructions further cause the optical receiver to:

determine, based on the received multiplexed optical signal, a nonlinear penalty, and cancel the nonlinear penalty.

16. The non-transitory computer readable medium of claim 15, wherein the optical channel generator includes:

a tone separator configured to wavelength division demultiplex the supercontinuum to form the channels;

a plurality of optical modulators configured to modulate the channels based on data to be transmitted; and a tone combiner configured to multiplex the modulated channels into the multiplexed optical signal.

17. The non-transitory computer readable medium of claim 15, wherein the diffuser includes highly nonlinear fiber (HNLF), and wherein the HNLF includes at least one of:

a narrow-core fiber with silica cladding;

a tapered fiber with air cladding;

a microstructured fiber that includes air holes introduced within a cladding; or a non-silica fiber.

18. The non-transitory computer readable medium of claim 15, wherein the amplifier includes an erbium doped fiber amplifier.

19. The non-transitory computer readable medium of claim 15, wherein the nonlinear penalty attenuates one of the channels relative to other ones of the channels, and wherein instructions further cause the optical receiver, when canceling the nonlinear penalty, to:

increase a magnitude of the attenuated one of the channels relative to the other ones of the channels.

20. The non-transitory computer readable medium of claim 15, wherein the light source includes a picosecond soliton laser.

* * * * *